(12) United States Patent
Tang et al.

(10) Patent No.: US 12,542,951 B2
(45) Date of Patent: Feb. 3, 2026

(54) VIDEO CONTENT PREVIEW INTERACTIVE METHOD AND APPARATUS, ELECTRONIC DEVICE, AND STORAGE MEDIUM

(71) Applicant: Douyin Vision Co., Ltd., Beijing (CN)

(72) Inventors: Yidan Tang, Beijing (CN); Zhilin Zhang, Beijing (CN); Siqi Tan, Beijing (CN); Yuzhang Du, Beijing (CN); Ye Lin, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/464,033

(22) Filed: Sep. 8, 2023

(65) Prior Publication Data

US 2024/0089542 A1    Mar. 14, 2024

(30) Foreign Application Priority Data

Sep. 9, 2022   (CN) .......................... 202211105139.3

(51) Int. Cl.
*H04N 21/472* (2011.01)
*H04N 21/431* (2011.01)
*H04N 21/488* (2011.01)

(52) U.S. Cl.
CPC ... *H04N 21/47217* (2013.01); *H04N 21/4316* (2013.01); *H04N 21/4884* (2013.01)

(58) Field of Classification Search
CPC ......... H04N 21/47217; H04N 21/4316; H04N 21/4884; H04N 21/4312; H04N 21/435; H04N 21/44213
See application file for complete search history.

(56) References Cited

U.S. PATENT DOCUMENTS

| 10,945,040 | B1* | 3/2021 | Bedi | G10L 15/26 |
| 12,096,068 | B2* | 9/2024 | Boudin | H04N 21/4394 |
| 2015/0016801 | A1* | 1/2015 | Homma | G11B 27/19 |
| | | | | 386/243 |
| 2016/0295294 | A1* | 10/2016 | Lan | H04N 21/845 |

(Continued)

FOREIGN PATENT DOCUMENTS

| CN | 110971956 A | 4/2020 |
| CN | 111212317 A | 5/2020 |
| CN | 111541859 A | 8/2020 |
| CN | 111988663 A | 11/2020 |

(Continued)

OTHER PUBLICATIONS

CN 112437353 Translation (Year: 2021).*

(Continued)

*Primary Examiner* — John R Schnurr
(74) *Attorney, Agent, or Firm* — Astute IP Law Group

(57) ABSTRACT

The embodiments of the present disclosure provide a video content preview interactive method and apparatus, an electronic device, and a storage medium. A video-playing interface is displayed, a progress bar component is provided in the video-playing interface, and the progress bar component is used for displaying a playing progress of a target video played in the video-playing interface; a target caption corresponding to a target timestamp of the target video is displayed in response to a moving instruction for the progress bar component, where the moving operation indicates the target timestamp of the target video, and the target caption indicates video content of the target video at the target timestamp.

17 Claims, 10 Drawing Sheets

(56) References Cited

U.S. PATENT DOCUMENTS

| | | | |
|---|---|---|---|
| 2019/0089994 A1* | 3/2019 | Sahasrabudhe | G11B 27/02 |
| 2020/0195877 A1* | 6/2020 | Li | G06F 3/04812 |
| 2020/0356593 A1* | 11/2020 | Azzinnari | G06F 16/64 |
| 2022/0198403 A1* | 6/2022 | Chen | H04L 12/1818 |
| 2022/0272284 A1* | 8/2022 | Chandrashekar | H04N 21/4884 |
| 2022/0382445 A1* | 12/2022 | Hu | G06F 40/166 |
| 2023/0036891 A1* | 2/2023 | Chen | G09B 19/06 |
| 2023/0108895 A1* | 4/2023 | Bao | G07C 5/0841 |
| | | | 701/32.1 |
| 2023/0283815 A1* | 9/2023 | Yan | H04N 21/8106 |
| | | | 725/116 |
| 2024/0045572 A1* | 2/2024 | Penha | H04N 21/4312 |
| 2024/0119654 A1* | 4/2024 | Huang | H04N 21/4394 |
| 2024/0155092 A1* | 5/2024 | Yang | G06V 30/19 |
| 2024/0236438 A1* | 7/2024 | Kim | H04N 5/278 |
| 2024/0305857 A1* | 9/2024 | Armitage | G11B 27/036 |
| 2024/0380948 A1* | 11/2024 | Bove, Jr. | H04N 21/47217 |

FOREIGN PATENT DOCUMENTS

| | | | | |
|---|---|---|---|---|
| CN | 112135181 A | | 12/2020 | |
| CN | 112231498 A | | 1/2021 | |
| CN | 112437353 A | * | 3/2021 | ....... H04N 21/47205 |
| CN | 113613082 A | | 11/2021 | |
| CN | 113891168 A | | 1/2022 | |
| CN | 114115668 A | | 3/2022 | |
| WO | 2019236727 A1 | | 12/2019 | |
| WO | 2021180155 A1 | | 9/2021 | |
| WO | WO-2023071349 A1 | * | 5/2023 | ........... H04N 21/485 |

OTHER PUBLICATIONS

International Search Report and Written Opinion in PCT/CN2023/116620, mailed Dec. 1, 2023, 8 pages.

Office Action received for Chinese Patent Application No. 202211105139.3, issued on Oct. 31, 2025, 14 pages (7 pages English translation, 7 pages original document).

* cited by examiner

VIDEO CONTENT PREVIEW INTERACTIVE METHOD AND APPARATUS, ELECTRONIC DEVICE, AND STORAGE MEDIUM

CROSS-REFERENCE TO RELATED APPLICATION

This application claims priority to Chinese Patent Application No. 202211105139.3, filed on Sep. 9, 2022, which is hereby incorporated by reference in its entirety.

TECHNICAL FIELD

Embodiments of the present disclosure relate to the field of Internet Technologies, and more particularly to a video content preview interactive method and apparatus, an electronic device, and a storage medium.

BACKGROUND

Currently, in video-playing software, in order to facilitate a user in adjusting the playing progress of a video, a video jumping function and a corresponding video preview function are provided. Namely, for a video, in the process of adjusting the playing progress of the video, before jumping is performed on the video, a video frame of a target jumping position is decoded and presented so that the user can preview the video content at the video position so as to decide whether to perform jumping.

However, in the prior art, the solution of presenting video content via a video frame of a target jumping position has a problem that the amount of information presented is small and the video content cannot be sufficiently presented.

SUMMARY

The embodiments of the present disclosure provide a video content preview interactive method and apparatus, an electronic device, and a storage medium, so as to overcome the problem that in the process of video content preview, the amount of information presented is small and the video content cannot be sufficiently presented.

In a first aspect, an embodiment of the present disclosure provides a video content preview interactive method, including:
  displaying a video-playing interface, where a progress bar component is provided in the video-playing interface, and the progress bar component is used for displaying a playing progress of a target video played in the video-playing interface; and in response to a moving instruction for the progress bar component, displaying a target caption corresponding to a target timestamp of the target video, where the moving instruction indicates the target timestamp of the target video, and the target caption indicates a video content of the target video at the target timestamp.

In the second aspect, an embodiment of the present disclosure provides a video content preview interactive apparatus, including:
  a displaying module, configured to display a video-playing interface, where a progress bar component is provided in the video-playing interface, and the progress bar component is used for displaying a playing progress of a target video played in the video-playing interface;
  a processing module, configured to, in response to a moving instruction for the progress bar component, display a target caption corresponding to a target timestamp of the target video, where the moving instruction indicates the target timestamp of the target video, and the target caption indicates a video content of the target video at the target timestamp.

In a third aspect, an embodiment of the present disclosure provides an electronic device, including:
  a processor and a memory communicatively connected to the processor;
  where the memory stores a computer executable instruction;
  the processor executes the computer executable instruction stored in the memory to implement the video content preview interactive method as described above in the first aspect and the various possible designs of the first aspect.

In a fourth aspect, an embodiment of the present disclosure provides a computer-readable storage medium storing a computer executable instruction, when the computer executable instruction is executed by a processor, the video content preview interactive method as described above in the first aspect and the various possible designs of the first aspect is implemented.

In a fifth aspect, an embodiment of the present disclosure provides a computer program product including a computer program, when the computer program is executed by a processor, the video content preview interactive method as described above in the first aspect and the various possible designs of the first aspect is implemented.

The embodiments of the present disclosure provide a video content preview interactive method and apparatus, an electronic device, and a storage medium, where a video-playing interface is displayed, a progress bar component is provided in the video-playing interface, and the progress bar component is used for displaying a playing progress of a target video played in the video-playing interface; a target caption corresponding to a target timestamp of the target video is displayed in response to a moving instruction for the progress bar component, where the moving instruction indicates the target timestamp of the target video, and the target caption indicates video content of the target video at the target timestamp. In response to the moving instruction for the progress bar component, the video content at the video position corresponding to the moving instruction is displayed in the form of caption, thereby realizing the caption preview for the target video so as to effectively improve the amount of information presented of the video and solve the problem that the video content cannot be sufficiently presented.

BRIEF DESCRIPTION OF THE DRAWINGS

In order to describe the embodiments of the present disclosure or the technical solutions in the prior art more clearly, in the following, the drawings needed in the description of the embodiments and the prior art will be briefly introduced. Obviously, the drawings in the following description are some embodiments of the present disclosure. For those of ordinary skills in the art, without paying creative efforts, other drawings can be obtained from these drawings.

DESCRIPTION OF EMBODIMENTS

To make the object, technical scheme, and advantage of the embodiments of the present disclosure clearer, the technical scheme in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by one of ordinary skills in the art without paying any creative efforts are within the scope of the present disclosure.

The application scenarios of the embodiments of the present disclosure are explained below.

Figure 1:
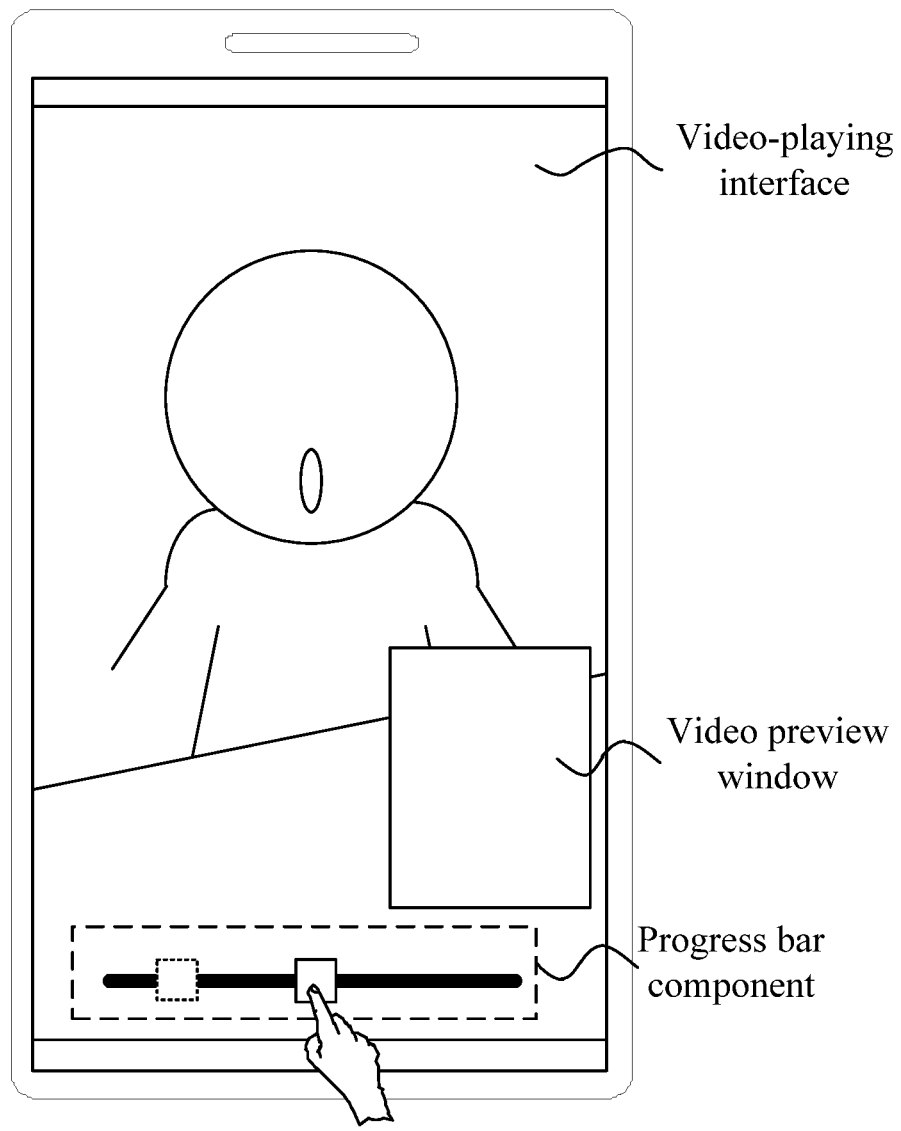
FIG. 1 is an application scenario diagram of a video content preview interactive method provided by an embodiment of the present disclosure.

FIG. 1 is an application scenario diagram of a video content preview interactive method provided by an embodiment of the present disclosure. The video content preview interactive method provided by an embodiment of the present disclosure can be applied to an application scenario of video playing. More specifically, it can be applied to an application scenario in which video preview is performed during video playing. As shown in FIG. 1, the method provided by an embodiment of the present disclosure may be applied to a terminal device, such as a smartphone, a tablet personal computer, etc. Exemplarily, a target application (Application, APP) for playing a video runs in the terminal device. More specifically, the target application is, for example, a short video platform application that downloads and plays a target video by connecting to a short video platform server. The target application has a video-playing interface, and a progress bar component for displaying a playing progress of the video is provided in the video-playing interface. In the process of playing the target video, a user can realize the jump-to-display (seek) of the target video, namely, the adjustment of the playing progress, by dragging a progress bar component in the video-playing interface; in the process, video content corresponding to a target video position to be jumped to can be previewed through a video preview window.

In the prior art, in order to enable a user, in the process of adjusting a video-playing progress, to learn the video content at a target video-playing position (namely, a jumped target position), a video frame at the video-playing position is displayed by presenting a preview window so as to realize video preview. However, in the process of practical applications, a video frame can only represent image information in a video, and cannot represent voice information in the video; at the same time, due to the static feature of the video frame, the preceding and following (context) information corresponding to the video-playing position cannot be represented; therefore, the video preview realized by the above-mentioned solution in the prior art has the problem of a small amount of information presented and insufficient presentation of the video content, thereby affecting the preview effect of the video content. An embodiment of the present disclosure provides a video content preview interactive method to solve the above problem.

Figure 2:
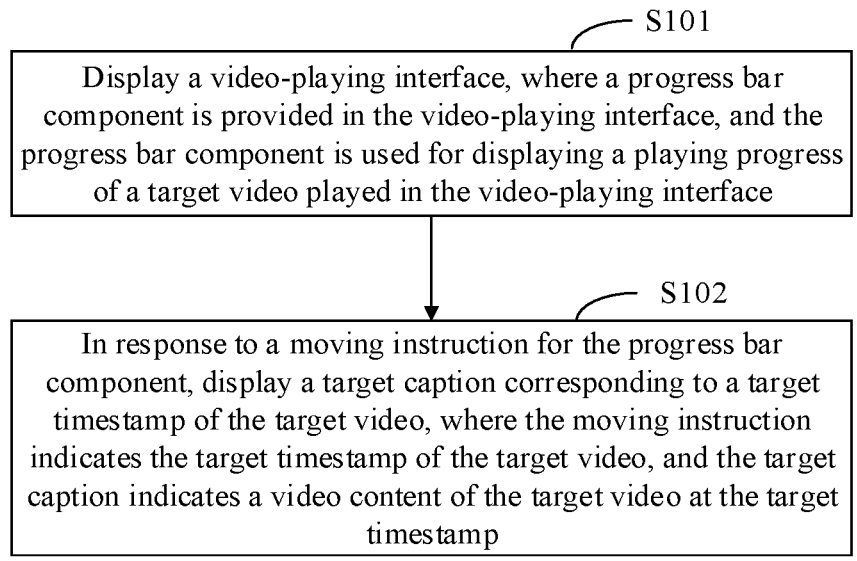
FIG. 2 is schematic flow diagram I of a video content preview interactive method provided by an embodiment of the present disclosure.

With reference to FIG. 2, FIG. 2 is schematic flow diagram I of a video content preview interactive method provided by an embodiment of the present disclosure. The method of the present embodiment can be applied to a terminal device, such as a smart phone, a personal computer, etc. In the present embodiment, the video content preview interactive method provided in the present embodiment is introduced by exemplarily taking a smart phone with a touch screen as an executive body. The video content preview interactive method includes:

step S101: display a video-playing interface, where a progress bar component is provided in the video-playing interface, and the progress bar component is used for displaying a playing progress of a target video played in the video-playing interface.

Exemplarily, a video-playing interface is an interface for playing a video in a target application of a video-playing type. The terminal device realizes the display of the video-playing interface by running the target application and calling a corresponding system component. The specific process will not be described in detail. The video-playing interface includes therein, in addition to the basic vide-playing component for playing the target video, a progress bar component for displaying the playing progress of the target video. In one possible implementation manner, the progress bar component can be implemented by a video-playing component, namely, the progress bar component is a sub-component in the vide-playing component for displaying the video-playing progress for the user. In another possible implementation manner, the progress bar component may be a component separate from the vide-playing component. Further, the progress bar component may, in addition to displaying the playing progress of the video played in the video-playing interface, control the video-playing progress in response to an operating instruction.

Figure 3:
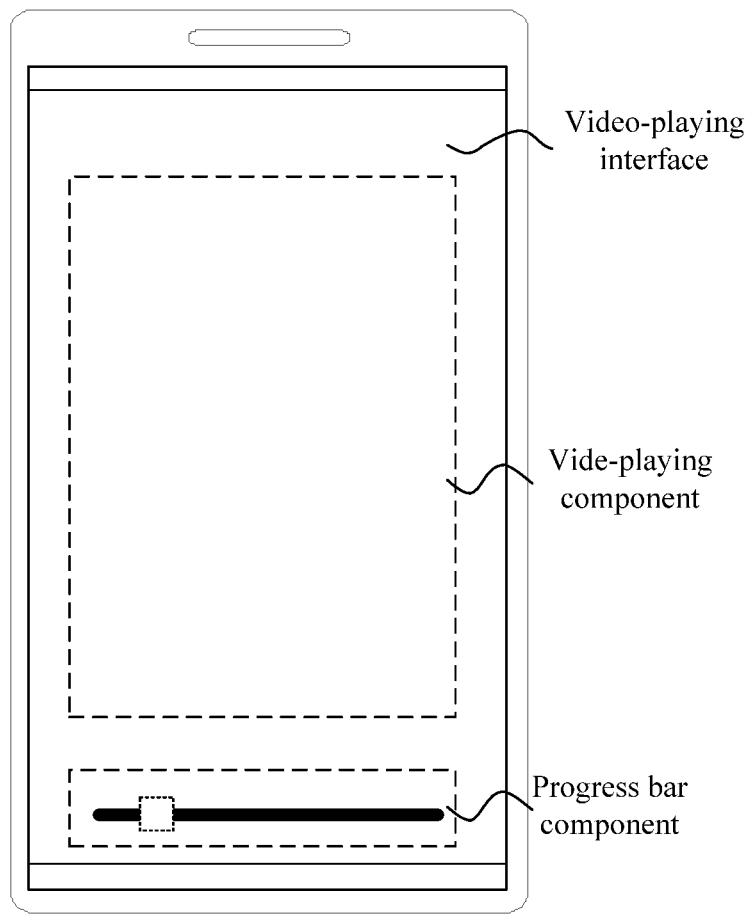
FIG. 3 is a schematic diagram of a video-playing interface provided by an embodiment of the present disclosure.

FIG. 3 is a schematic diagram of a video-playing interface provided by an embodiment of the present disclosure. As shown in FIG. 3, exemplarily, a video-playing component and a progress bar component are provided in the video-playing interface, and the progress bar component is provided at a position below the vide-playing component. During the process when the vide-playing component plays a target video, on the one hand, a progress identification in the progress bar component moves as the playing progress of the target video changes. On the other hand, when a user operates the progress bar component by applying a gesture operation on a touch screen, for example, dragging the progress identification of the progress bar component, the playing progress of the target video played in the vide-playing component is correspondingly controlled, namely, the playing of the target video is jumped. The specific implementation principles of the above-mentioned vide-playing component and progress bar component are prior art and will not be described in detail herein.

Step S102: in response to a moving instruction for the progress bar component, display a target caption corresponding to a target timestamp of the target video, where the moving instruction indicates the target timestamp of the target video, and the target caption indicates a video content of the target video at the target timestamp.

Further, referring to a schematic diagram of a video-playing interface shown in FIG. 3, when a user applies a moving operation on the progress bar component via a touch screen, the terminal device will detect the moving operation and generate a corresponding operating instruction to control the progress bar component. The moving operation may include a dragging operation or a clicking operation on the progress bar component. In particular, the dragging operation is a non-releasing dragging gesture performed on the progress identification in the progress bar component, namely, it is a dragging gesture always in a button down state. When the progress identification is dragged to a certain identification position in the progress bar component, a corresponding first video position is determined based on a time stamp corresponding to the identification position. The clicking operation is a non-releasing clicking operation for a certain identification position in the progress bar component. In response to the non-releasing clicking operation, the progress identification in the progress bar component can be moved to an identification position (or the progress identification does not move), and then a corresponding first video position is determined based on a time stamp corresponding to the identification position.

Further, the first video position may be represented by a playing time stamp of the target video. After the first video position is obtained, based on the corresponding time stamp, subtitle caption corresponding to the time stamp, namely, target caption, is obtained from pre-set caption data corresponding to the target video (the target video and the corresponding caption data have consistent time stamps). Then the target caption is displayed in a pre-set area of the video-playing interface. Since the moving operation is a continuous operation (such as dragging a progress identification), one moving operation can correspond to multiple first video positions. Therefore, as the moving operation continues, the target caption corresponding to respective first video positions is synchronously displayed in the video-playing interface.

Figure 4:
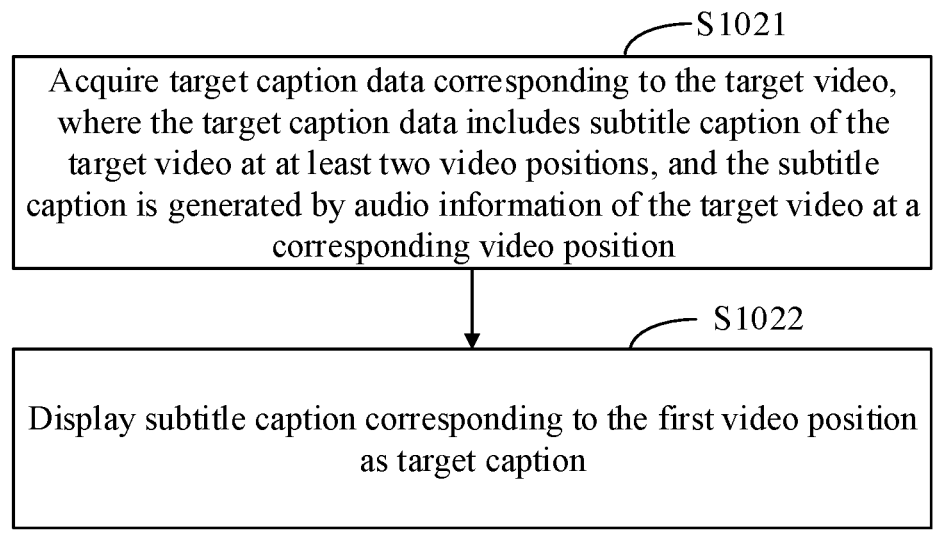
FIG. 4 is a flowchart of specific implementation steps of step S102 in the embodiment shown in FIG. 2.

In one possible implementation manner, as shown in FIG. 4, the specific implementation steps of step S102 exemplarily include:

step S1021: acquire target caption data corresponding to the target video, where the target caption data includes subtitle caption of the target video at at least two video positions, and the subtitle caption is generated by audio information of the target video at a corresponding video position;

step S1022: display subtitle caption corresponding to the first video position as target caption.

Exemplarily, the target caption data corresponding to the target video can be pre-generated data. The target caption data includes therein subtitle caption corresponding to the target video at different time stamp positions, and the subtitle caption is obtained after processing the target video based on a speech recognition technology; more specifically, the target caption data can be obtained by a terminal device by accessing a server, or obtained after the terminal device processes the target video, which will not be described in detail by way of example.

Figure 5:
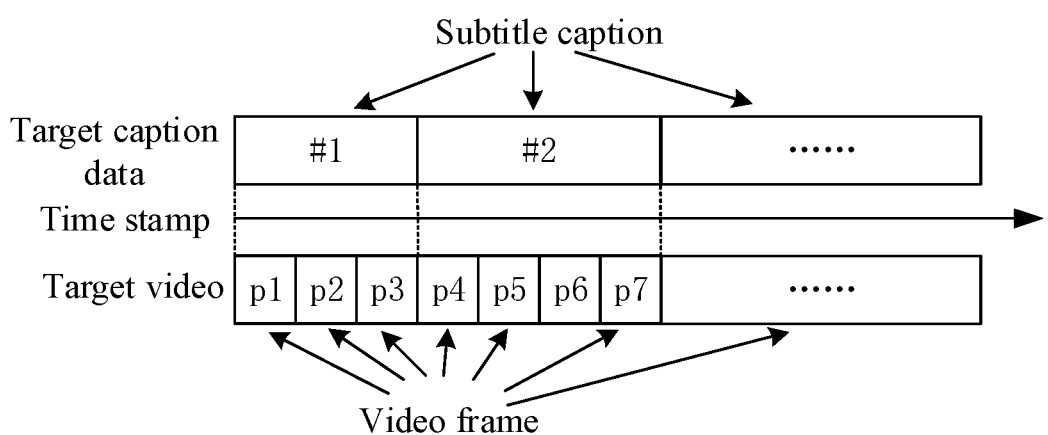
FIG. 5 is a schematic diagram of target caption data provided by an embodiment of the present disclosure.

FIG. 5 is a schematic diagram of target caption data provided by an embodiment of the present disclosure. As shown in FIG. 5, the target caption data includes therein N pieces of subtitle caption. Each piece of subtitle caption corresponds to at least one video frame of the target video, and the pieces of subtitle caption are aligned with the video frames of the target video by time stamps, i.e. with reference to the figure, exemplarily, the subtitle caption #1 corresponds to video frames p1-p3, and the subtitle caption #2 corresponds to video frames p4-p7. After obtaining the target caption data corresponding to the target video, the corresponding subtitle caption is obtained from the target caption data based on a time stamp corresponding to the first video position, and the subtitle caption is displayed as the target caption.

In the present embodiment, based on independent caption data and a first video position corresponding to a moving operation, corresponding target caption is obtained and displayed using a unified time stamp; since video decoding is not required for the display process of the caption data, with respect to the solution of performing video content preview based on video frames in the prior art, resource consumption is smaller, and therefore the display of the target caption is better in real time, and the operation fluency and fineness are better.

On the other hand, in the solution of video content preview based on video frames in the prior art, since the time interval between video frames is short, when responding to the moving operation, even if two moving operations are continuous, a frame leakage phenomenon will occur, consequently, a complete expression of the video content cannot be realized. However, in the mode of using subtitle caption for performing video content preview, since the time span corresponding to the subtitle caption is large, by continuous moving operations, the continuous preview of adjacent subtitle caption can be realized, and continuous context information can be displayed. Therefore, a complete expression of the video content (in the caption dimension) is achieved.

Furthermore, with regard to the above-mentioned moving operation, the moving operations are all non-releasing operations. This is because the progress bar component can be used for controlling the playing progress of the target video, and when the moving gesture is released (for example, undoing the gesture of dragging the progress identification), based on the video position when the moving gesture is released, the corresponding jump-to-display is triggered. For this case, in another possible implementation manner, the progress bar component includes a first progress identification and a second progress identification, the first progress identification is for controlling a preview position of the target video and the second progress identification is for controlling the playing progress of the target video. In response to the moving instruction for the progress bar component, the specific implementation manner for displaying the target caption corresponding to the target timestamp of the target video is: in response to the moving instruction for the first progress identification, displaying target caption corresponding to the preview position in a video preview view of the video-playing interface.

Figure 6:
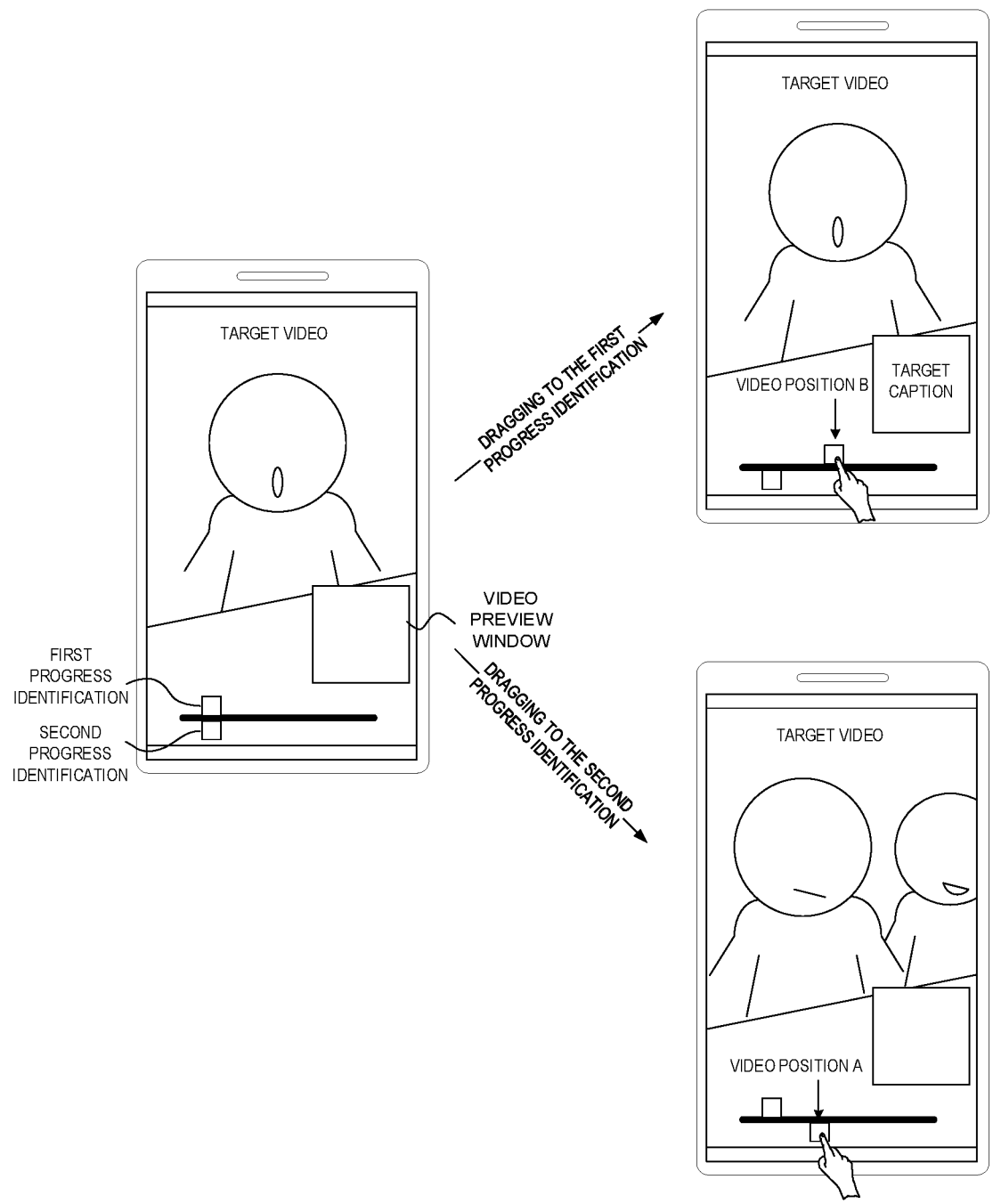
FIG. 6 is a schematic diagram of a progress component provided by an embodiment of the present disclosure.

FIG. 6 is a schematic diagram of a progress component provided by an embodiment of the present disclosure. As shown in FIG. 6, a progress bar component includes a first progress identification and a second progress identification. For example, in the case of normally playing a target video, the target video and corresponding caption subtitle are synchronously played based on a playing time stamp of the target video in a video-playing interface, and the time stamps of the target video and the corresponding caption subtitle are consistent. Exemplarily, a caption subtitle may be pre-generated to describe caption characterizing the video content. When the user performs an operation on the second progress identification, for example, dragging or clicking (in the figure, dragging the second progress identification) to move the second progress identification to a video position A, the playing of the target video can be controlled, namely, jump-to-play can be realized, and this process is a conventional means for realizing jump-to-play of a video in the prior art and will not be described in detail. When the user performs an operation on the first progress identification, for example, dragging or clicking (in the figure, dragging the first progress identification) to move the first node to a video position B (a first video position), caption corresponding to the first video position, namely, target caption, will be displayed in the video-playing interface, and in an implementation, the target caption is displayed in a video preview view of the video-playing interface. At this time, since the second progress identification controlling the playing progress of the video is not moved, the target video and the corresponding caption subtitle in the second video-playing interface are still played normally. But at the same time, the user can preview the caption subtitle at the first video position (namely, the preview position) based on the video preview view.

In the implementation manner where the progress bar component includes one progress identification, in the case where the user only needs to perform preview and does not need to perform jumping, when the moving operation on the progress identification is finished, there is a problem that the progress identification cannot be manually restored to the identification position corresponding to the current playing progress of the video, resulting in an unexpected jump-to-play of the target video which is played normally. However, in the present embodiment, by setting a first progress identification and a second progress identification respectively used for controlling the preview position and the playing progress, the operation decoupling of the control on the video-playing progress and the video content preview is realized; when the video content is previewed and the target caption is displayed through the moving operation, since the operation on the second progress identification is not involved, the normal play of the target video will not be affected; therefore, the unexpected jump-to-play of the target video after the moving operation is finished can be avoided, and the video play fluency can be improved.

In the present embodiment, by displaying a video-playing interface, a progress bar component is provided in the video-playing interface, and the progress bar component is used for displaying a playing progress of a target video played in the video-playing interface; corresponding target caption is displayed in response to a moving operation for the progress bar component, where the moving operation is used for indicating a first video position of the target video, and the target caption characterizes video content of the target video at the first video position. In response to the moving operation for the progress bar component, the video content at the video position corresponding to the moving operation is displayed in the form of caption, thereby realizing the caption preview for the target video so as to effectively improve the amount of information presented of the video and solve the problem that the video content cannot be sufficiently presented.

Figure 7:
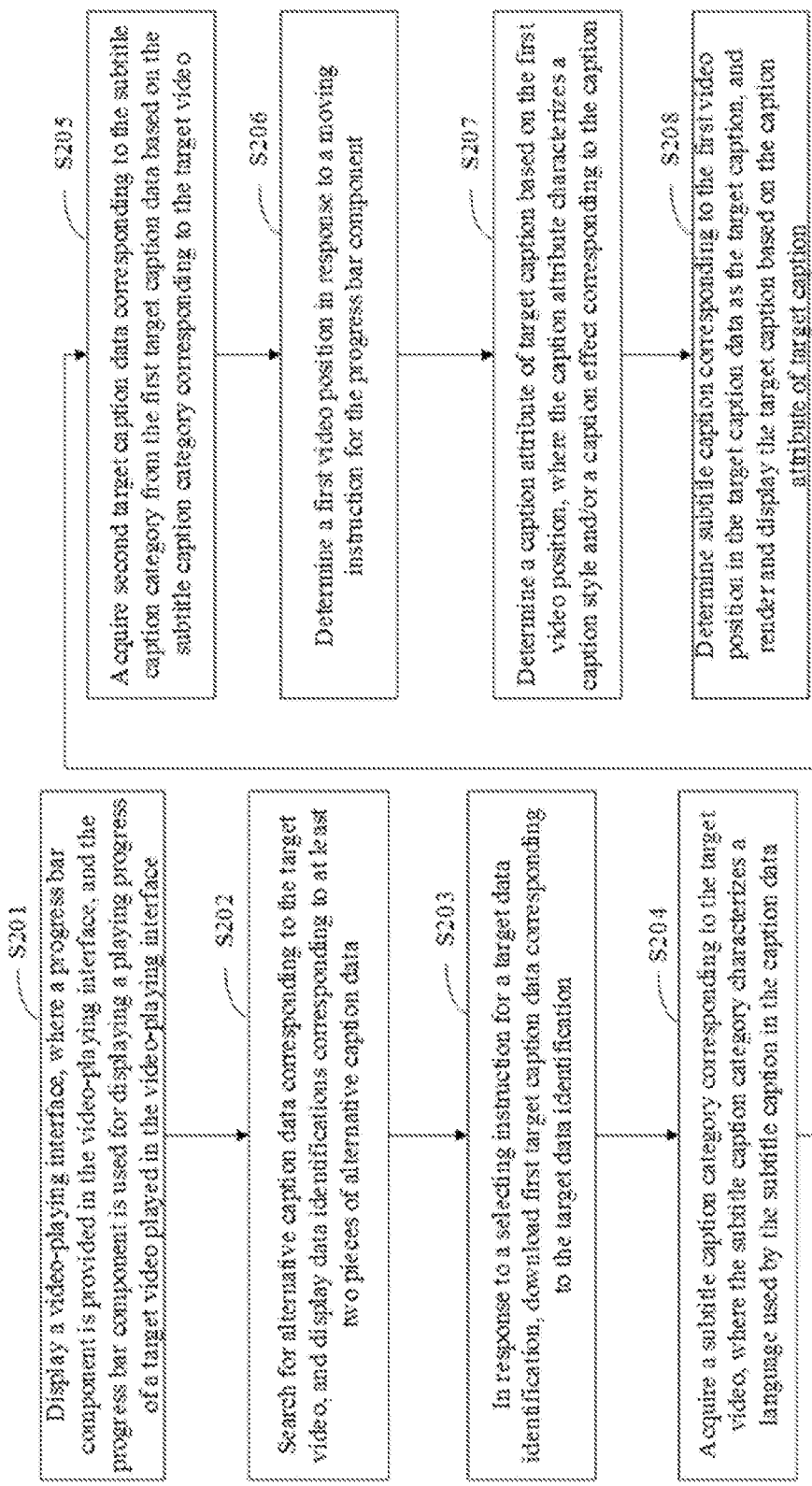
FIG. 7 is schematic flow diagram II of a video content preview interactive method provided by an embodiment of the present disclosure.

With reference to FIG. 7, FIG. 7 is schematic flow diagram II of a video content preview interactive method provided by an embodiment of the present disclosure. The present embodiment further refines the implementation process of step S102 based on the embodiment shown in FIG. 2. The video content preview interactive method includes:

step S201: display a video-playing interface, where a progress bar component is provided in the video-playing interface, and the progress bar component is used for displaying a playing progress of a target video played in the video-playing interface;

step S202: search for alternative caption data corresponding to the target video, and display data identifications corresponding to at least two pieces of alternative caption data;

step S203: in response to a selecting instruction for a target data identification, download first target caption data corresponding to the target data identification.

Exemplarily, in connection with the introduction of caption data in the above embodiments, the caption data is descriptive caption for a target video, as relative to a time stamp of the target video, for characterizing the content of the target video at the corresponding time stamp position. The caption data is composed of multiple pieces of subtitle caption, and the subtitle caption can be generated by parsing and recognizing audio information about the target video. In one possible implementation manner, the caption data is subjective descriptive caption of the target video, for example, a user uploaded video bullet screen, a video narrative subtitle, etc. In this case, the caption data may be obtained based on different algorithms, or made by different users. The target video can correspond to multiple pieces of alternative caption data, and the alternative caption data can be stored in a server (namely, a service-side of the target application) in communication with the target application; before playing the target video or during the playing, the terminal device can obtain alternative caption data corresponding to the target video by accessing the server and performing caption data search for the target video. Thereafter, the terminal device may display the data identification corresponding to the alternative caption data in an interface of the application, for example, in a video-playing interface, and then one of the multiple pieces of alternative caption data is selected as the first target caption data based on a selecting instruction of the user. Subsequent display of the target caption is performed based on the first target caption data selected by the user.

Figure 8:
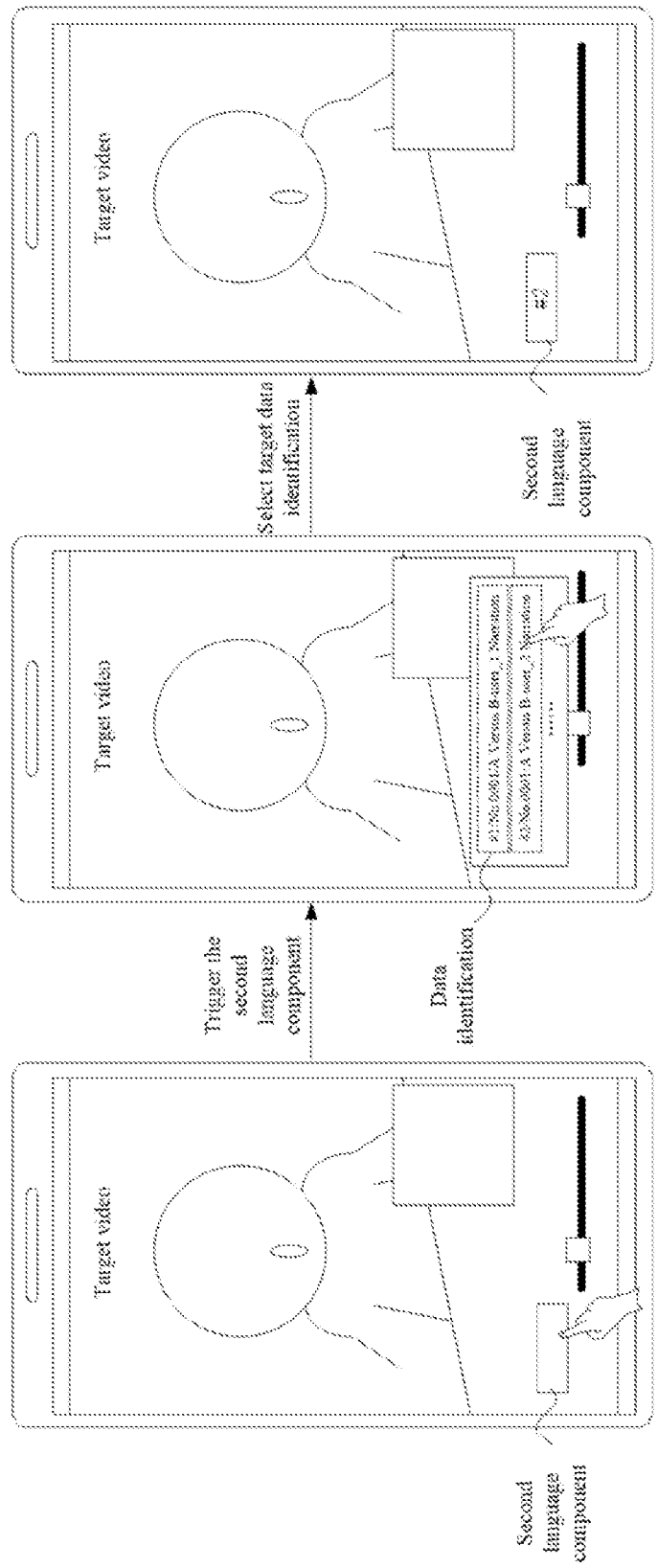
FIG. 8 is a schematic diagram of an operation on a second language component provided by an embodiment of the present disclosure.

FIG. 8 is a schematic diagram of an operation on a second language component provided by an embodiment of the present disclosure. As shown in FIG. 8, exemplarily, in a video-playing interface, a second language component is provided for displaying a search result for alternative caption data of a target video after being triggered. Referring to FIG. 8, the target video is, for example, a game video, and the corresponding alternative caption data is textual narration for the game video. After the second language component is triggered, a data identification of the alternative caption data corresponding to the target video is displayed in the corresponding display view. More specifically, the data identification is a character string including therein a ranking number, a target video number, and introduction information. Exemplarily, for example, with respect to the data identification with the ranking number #1, the corresponding target video number is No. 0001, and the corresponding introduction information is "A versus B-user_1 narration"; for example, with respect to the data identification with the ranking number #2, the corresponding target video number is No. 0001, and the corresponding introduction information is "A versus B-user_2 narration". Then, in response to a selecting instruction, a target data identification (the data identification with the ranking number #2) is selected, and the selection result is displayed in the second language component, shown in the figure as displaying the ranking number #2 corresponding to the target data identification. Thereafter, by accessing the server, the corresponding first target caption data is obtained and loaded. With reference to FIG. 8, the selection of the caption data can be achieved based on the alternative caption data searched and displayed by the second language component. The user can select the first target caption data of interest therefrom based on personal preferences. In a subsequent step, the target caption is displayed for intra-video preview based on the first target caption data, thereby improving the flexibility and diversity of the video content preview and satisfying the personalized requirements of the user.

Step S204: acquire a subtitle caption category corresponding to the target video, where the subtitle caption category characterizes a language used by the subtitle caption in the caption data.

Step S205: acquire second target caption data corresponding to the subtitle caption category from the first target caption data based on the subtitle caption category corresponding to the target video.

Further, after determining the first target caption data, the target application may realize a non-verbal-based display for the subtitle caption in the first target caption data, i.e. the target video may correspond to multiple subtitle caption categories. Exemplarily, the first target caption data includes therein first caption data, second caption data, and third caption data, where the first caption data is Chinese-based caption, the second caption data is English-based caption, and the third caption data is Russian-based caption. The semantics characterized by the first caption data, the second caption data, and the third caption data are consistent, but in different languages. More specifically, for example, the second caption data and the third caption data may be obtained after the translation based on the first caption data.

Exemplarily, the corresponding subtitle caption category is displayed by presenting identifications of the corresponding sub-data (such as the first caption data, the second caption data, and the third caption data in the above embodiment) based on different languages in the first caption data. Then, based on a setting instruction of a user, a target category is selected from multiple subtitle caption categories, and caption data corresponding to the target category is used to determine the second target caption data.

Figure 9:
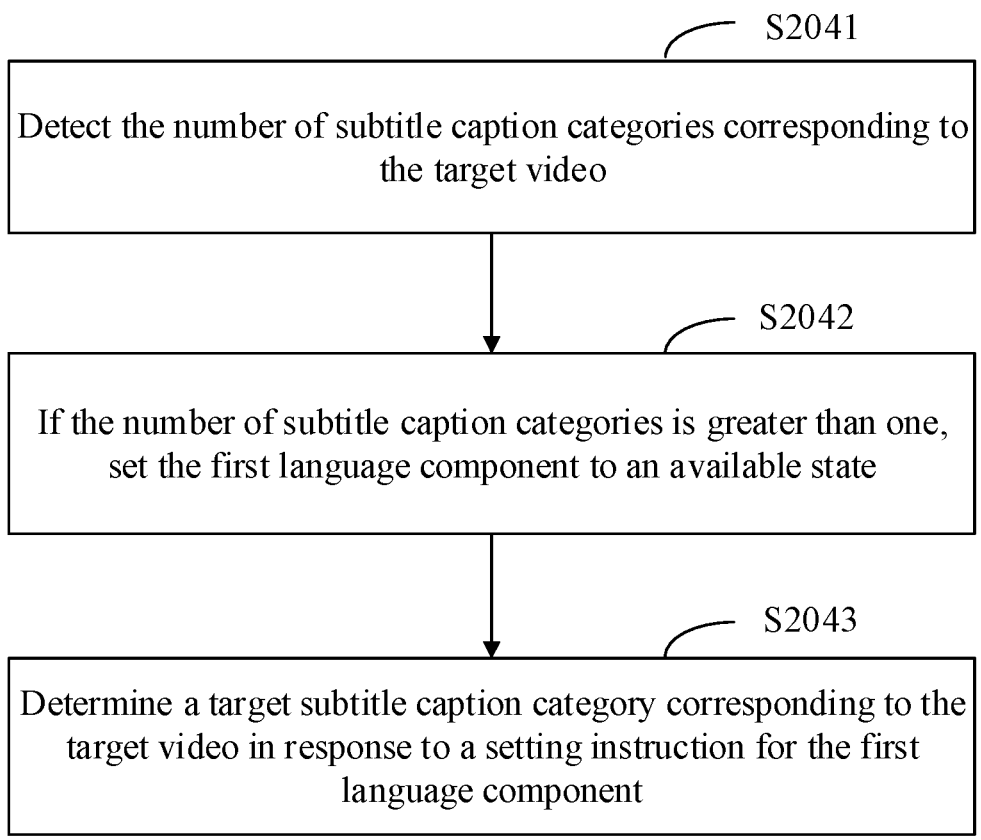
FIG. 9 is a flowchart of specific implementation steps of step S204 in the embodiment shown in FIG. 7.

Exemplarily, a first language component is provided in the video-playing interface for presenting at least two subtitle caption categories. As shown in FIG. 9, the specific implementation steps of step S204 include:

step S2041: detecting the number of subtitle caption categories corresponding to the target video;

step S2042: if the number of subtitle caption categories is greater than one, setting the first language component to an available state;

step S2043: determining a target subtitle caption category corresponding to the target video in response to a setting instruction for the first language component.

Figure 10:
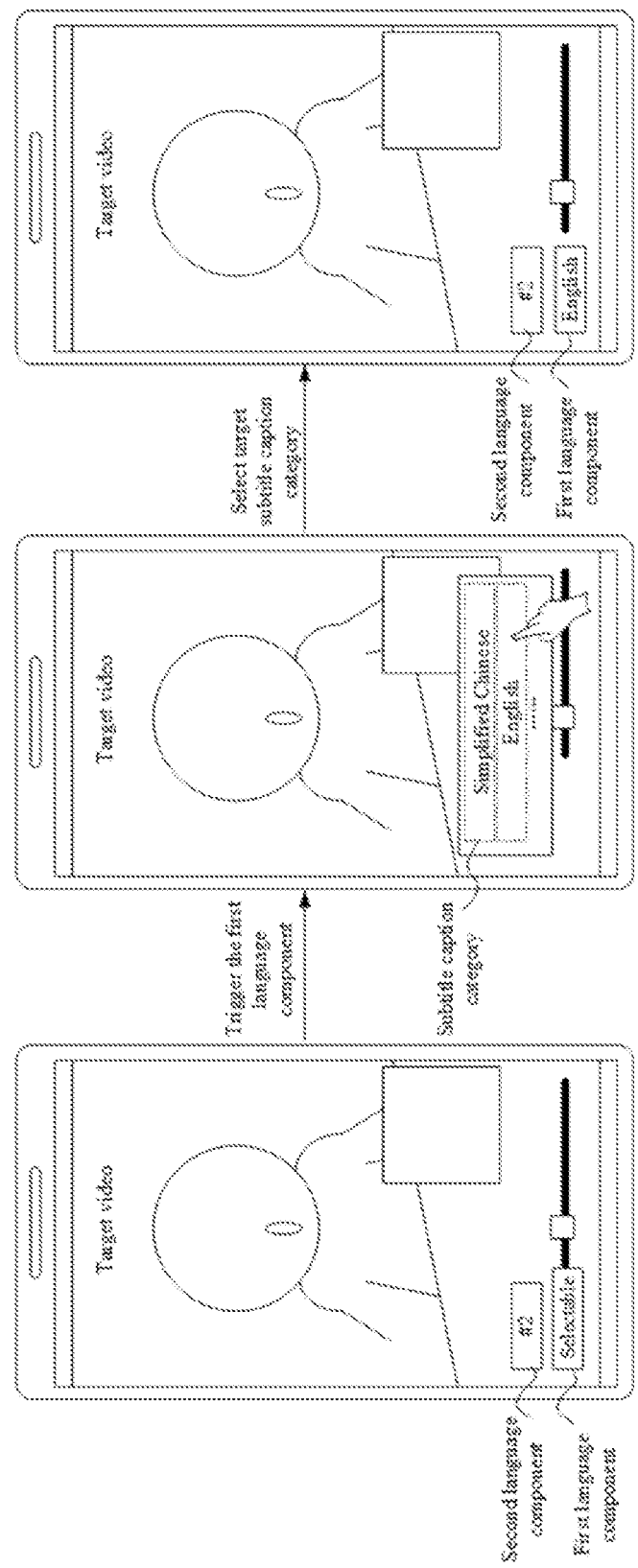
FIG. 10 is a schematic diagram of an operation on a first language component provided by an embodiment of the present disclosure.

FIG. 10 is a schematic diagram of an operation on a first language component provided by an embodiment of the present disclosure. The above process is introduced in combination with FIG. 10. As shown in FIG. 10, for example, after determining the first target caption data (corresponding to the ranking number #2) via the second language component, the number of sub-caption-data based on different languages in the first target caption data is detected, namely, the number of subtitle caption categories corresponding to the target video is detected; if the number is greater than one, it indicates that a user can select a subtitle caption category of interest therein, and at this moment, the first language component is set to an available state; more specifically, the available state includes, for example, a visible state and a clickable state (in the figure, the word "selectable" is displayed in the first language component); in contrast, if the number is equal to one, the first target caption data only includes therein caption data of one language. The first language component is set to an unavailable state, e.g. invisible and not clickable.

Thereafter, referring to FIG. 10, in the case where the first language component is in the available state, the first language component is triggered to present available subtitle caption categories, such as "Simplified Chinese" and "English" in FIG. 10, in the corresponding view page. Subsequently in response to a setting instruction (such as a clicking operation) applied on the first language component, selecting one of multiple subtitle caption categories in the first language component as a target subtitle caption category (namely, selecting a target subtitle caption category), and then taking caption data corresponding to the target subtitle caption category as the second target caption data for subtitle display.

In the present embodiment, by setting the first language component, the language of the subtitle caption is further selected so as to enable the target caption to be displayed in a specific language in the process of subsequently displaying the target caption and realizing the video content preview, thereby improving the flexibility and the amount of information presented of the video content preview and satisfying diverse preview requirements of the user.

It should be noted that in the present embodiment, steps S202-S203 are steps for selecting alternative caption data of a target video, and steps S204-S205 are steps for selecting a caption category of the target video, and the above-mentioned two steps can be executed successively in the manner in the present embodiment; in other embodiments provided by the present disclosure, it is also possible to execute the step alone, omitting one of them, for example, after selecting alternative caption data of the target video and obtaining the first target caption data, executing subsequent steps directly based on the first target caption data (only executing steps S202-S203); or there may be only one piece of alternative caption data for the target video, and therefore, the selection for the caption category may be based on one unique piece of alternative caption data. (Only steps S202-S203 are executed). The implementation of the specific steps in the above-described manner is similar to the introduction described previously with respect to steps S202-S205, and will not be repeated herein.

Step S206: determine a first video position in response to a moving instruction for the progress bar component.

Step S207: determine a caption attribute of target caption based on the first video position, where the caption attribute characterizes a caption style and/or a caption effect corresponding to the caption.

Step S208: determine subtitle caption corresponding to the first video position in the target caption data as the target caption, and render and display the target caption based on the caption attribute of the target caption.

Exemplarily, the caption attribute includes at least one of the following: font type, font size, and font color.

By way of example, the terminal device then detects the moving operation input by the user, and determines, based on the moving operation, one corresponding first video position; if the moving operation is a continuous operation (e.g. a dragging operation), the first video position is a video position corresponding to one transient operation; the specific implementation manner of the moving operation and the corresponding response are described in detail in the embodiment shown in FIG. 2, and will not be described in detail herein.

Further, at different first video positions, the corresponding target caption has a corresponding caption attribute. That is, as the first video position changes, the style and special effect of the displayed target caption also change.

Figure 11:
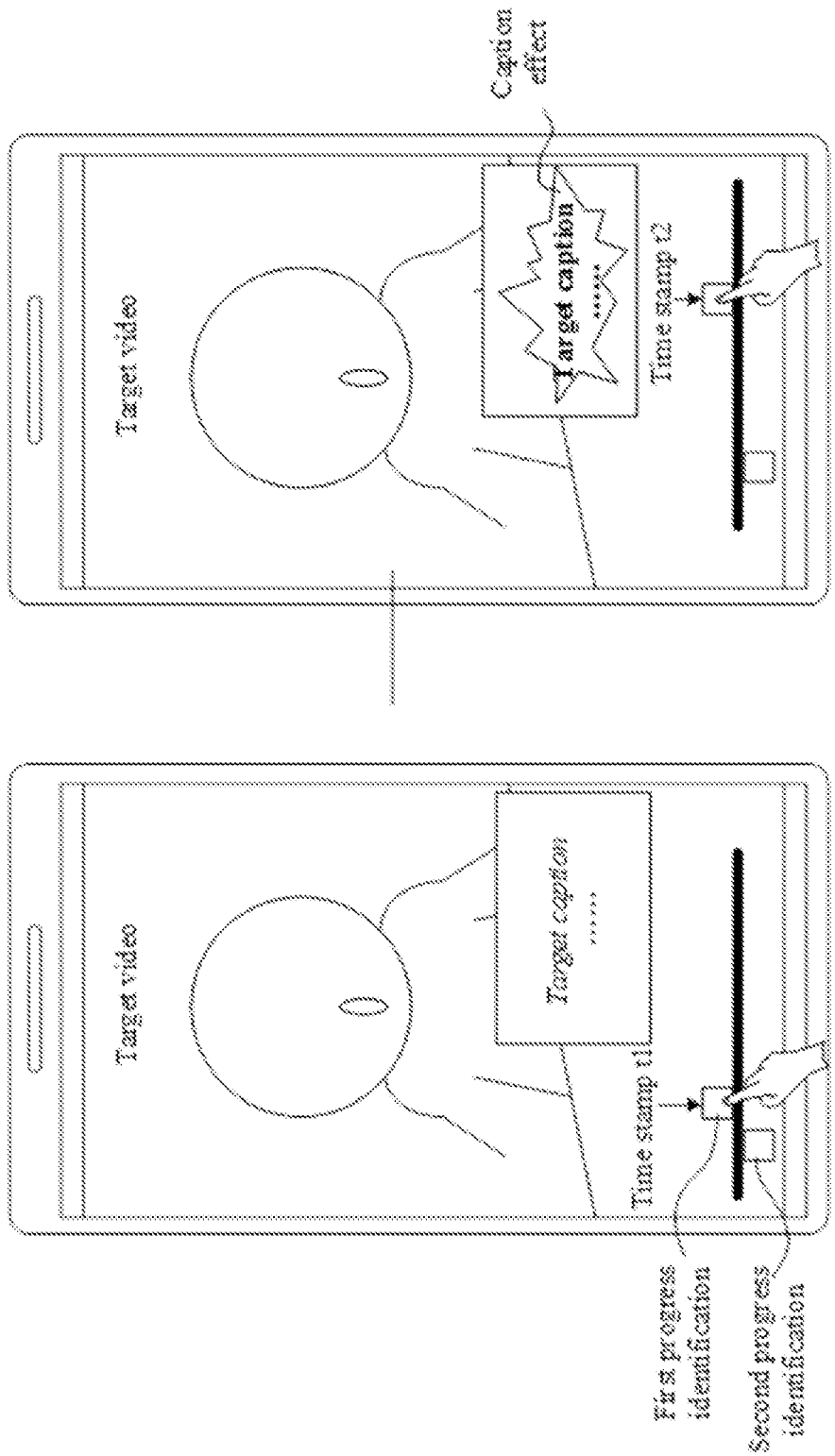
FIG. 11 is a schematic diagram of a change of a caption attribute provided by an embodiment of the present disclosure.

FIG. 11 is a schematic diagram of a change of a caption attribute provided by an embodiment of the present disclosure. As shown in FIG. 11, when the first progress identification (reference can be made to the related introduction in the embodiment shown in FIG. 6) in the progress identification is moved to the first video position (a time stamp t1) based on the moving operation, the target caption has a first caption attribute; as shown in the figure, a font corresponding to the target caption is in italics; when the first progress identification in the progress identification is moved to a second video position (a time stamp t2), the target caption has a second caption attribute; as shown in the figure, the font corresponding to the target caption is bolded, and the target caption has a caption effect (which can be realized based on mapping and rendering). The direct mapping relationship between video positions and caption attributes may be preset, may be determined by configuration data stored in the first target caption data or the second target caption data, which will not be described in detail herein.

In the present embodiment, by determining the corresponding caption data based on the video position, and rendering and displaying the target caption based on different caption data, the font and special effect of the target caption change with the change of the moving operation, so as to highlight the important content in the target video in the process of video content preview through the target caption, thereby improving the guiding effect of the video preview and the sufficiency of the information presentation.

In the present embodiment, the implementation manner of step S201 is the same as the implementation manner of step S101 in the embodiment shown in FIG. 2 of the present disclosure, and will not be described in detail herein.

Figure 12:
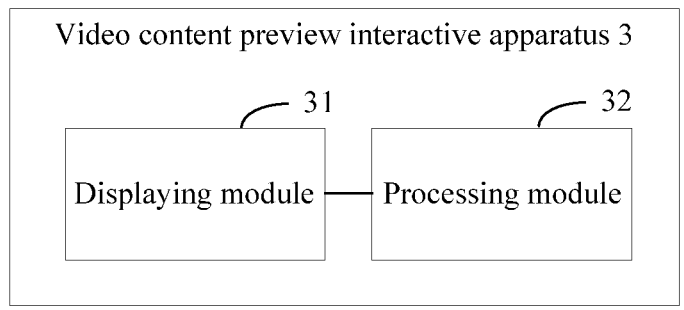
FIG. 12 is a structural block diagram of a video content preview interactive apparatus provided by an embodiment of the present disclosure.

Corresponding to the video content preview interactive method of the above embodiments, FIG. 12 is a structural block diagram of a video content preview interactive apparatus provided by an embodiment of the present disclosure. For ease of illustration, only portions related to embodiments of the present disclosure are shown. With reference to FIG. 12, a video content preview interactive apparatus 3 includes:

a displaying module 31, configured to display a video-playing interface, where a progress bar component is provided in the video-playing interface, and the progress bar component is used for displaying a playing progress of a target video played in the video-playing interface;

a processing module 32, configured to, in response to a moving instruction for the progress bar component, displaying a target caption corresponding to a target timestamp of the target video, where the moving instruction indicates the target timestamp of the target video, and the target caption indicates a video content of the target video at the target timestamp.

In one embodiment of the present disclosure, the progress bar component includes a first progress identification and a second progress identification, where the first progress identification is used for controlling a preview position of the target video, and the second progress identification is used for controlling the playing progress of the target video; the processing module 32 is specifically configured to: in response to the moving instruction for the first progress identification, display target caption corresponding to the preview position in a video preview view of the video-playing interface.

In one embodiment of the present disclosure, the target caption has a caption attribute characterizing a caption style and/or caption effect corresponding to the target caption; the caption attribute of the target caption is determined by the first video position.

In one embodiment of the present disclosure, the caption attribute includes at least one of: font type, font size, and font color.

In one embodiment of the present disclosure, when displaying the target caption corresponding to the target timestamp of the target video, the processing module 32 is specifically configured to: acquire target caption data corresponding to the target video, where the target caption data includes subtitle caption of the target video at at least two video positions, and the subtitle caption is generated by audio information of the target video at a corresponding video position; and display subtitle caption corresponding to the first video position as the target caption.

In one embodiment of the present disclosure, when acquiring the target caption data corresponding to the target video, the processing module 32 is specifically configured to: acquire a subtitle caption category corresponding to the target video, where the subtitle caption category characterizes a language used by the subtitle caption in the caption data; and acquire the target caption data corresponding to the target video based on the subtitle caption category corresponding to the target video.

In one embodiment of the present disclosure, a first language component is provided in the video-playing interface, and the language component is used for presenting at least two subtitle caption categories; when acquiring the subtitle caption category corresponding to the target video, the processing module 32 is specifically configured to: detect the number of subtitle caption categories corresponding to the target video; if the number of subtitle caption categories is greater than 1, set the first language component to an available state; and determine a target subtitle caption category corresponding to the target video in response to a setting instruction for the first language component.

In one embodiment of the present disclosure, when acquiring the target caption data corresponding to the target video, the processing module 32 is specifically configured to: search for alternative caption data corresponding to the target video; display data identifications corresponding to at least two pieces of alternative caption data; in response to a selecting instruction for a target data identification, download target caption data corresponding to the target data identification.

The displaying module 31 and the processing module 32 are connected. The video content preview interactive apparatus 3 provided in the present embodiment can execute the technical solution of the above-mentioned method embodiments, and the implementation principles and technical effects are similar, which will not be described in detail in the present embodiment.

Figure 13:
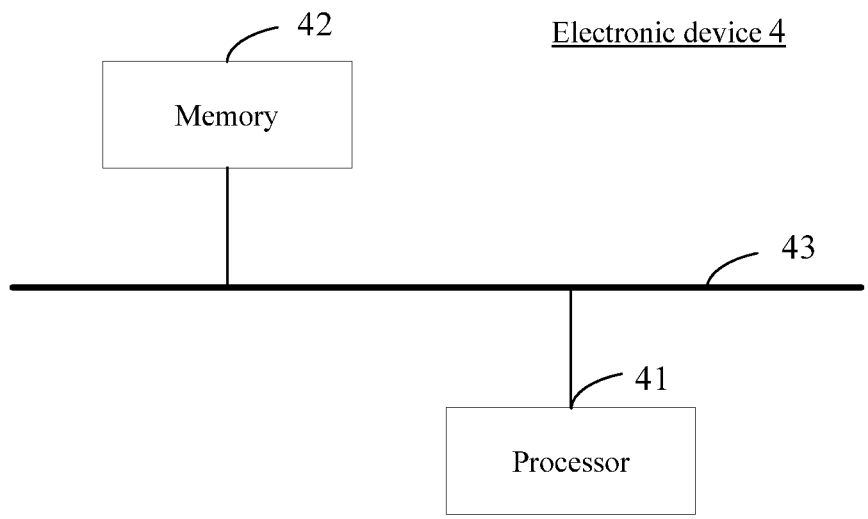
FIG. 13 is a schematic structural diagram of an electronic device provided by an embodiment of the present disclosure.

FIG. 13 is a schematic structural diagram of an electronic device provided by an embodiment of the present disclosure. As shown in FIG. 13, the electronic device 4 includes:
   a processor 41 and a memory 42 communicatively connected to the processor 41;
   where the memory 42 stores a computer executable instruction;
   the processor 41 executes the computer executable instruction stored in the memory 42 to implement the video content preview interactive method in embodiments shown in FIGS. 2-11.

In an implementation, the processor 41 and the memory 42 are connected via a bus 43.

The relevant description can be understood with reference to the relevant description and effects corresponding to the steps in the embodiments corresponding to FIGS. 2-11, which will not be repeated herein.

Figure 14:
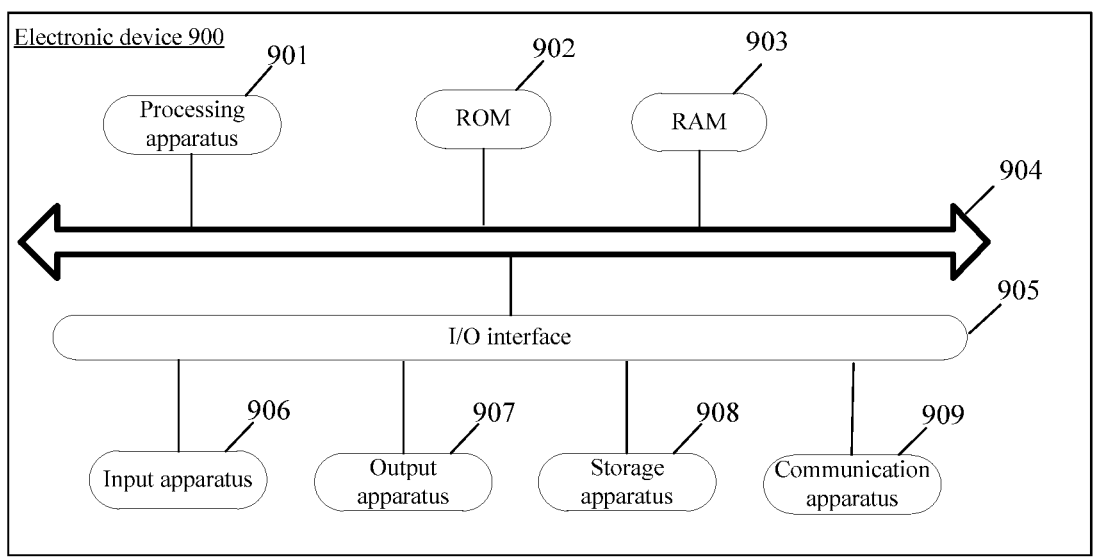
FIG. 14 is a hardware schematic structural diagram of an electronic device provided by an embodiment of the present disclosure.

Referring to FIG. 14, a schematic structural diagram of an electronic device 900 suitable for implementing an embodiment of the present disclosure is shown. The electronic device 900 can be a terminal device or a server. Here, the terminal device may include, but is not limited to, a mobile terminal such as a mobile phone, a notebook computer, a digital broadcast receiver, a personal digital assistant (PDA), a portable android device (PAD), a portable multimedia player (Portable Media Player, PMP), a vehicle terminal (e.g. a vehicle navigation terminal), etc., and a fixed terminal such as a digital TV, a desktop computer, and the like. The electronic device shown in FIG. 14 is only one example and should not impose any limitation on the function and scope of use of the embodiments of the present disclosure.

As shown in FIG. 14, the electronic device 900 may include a processing apparatus (e.g. a central processor, a graphic processor, etc.) 901 that may execute various suitable actions and processes in accordance with a program stored in a read only memory (ROM) 902 or a program loaded from a storage apparatus 908 into a random access memory (RAM) 903. In the RAM 903, various programs and data required for the operation of the electronic device 900 are also stored. The processing apparatus 901, the ROM 902, and the RAM 903 are connected to each other via a bus 904. An input/output (I/O) interface 905 is also connected to a bus 904.

In general, the following apparatus may be connected to the I/O interface 905: an input apparatus 906 including, for example, a touch screen, a touch pad, a keyboard, a mouse, a camera, a microphone, an accelerometer, a gyroscope, etc.; an output apparatus 907 including, for example, a liquid crystal display (LCD), a speaker, a vibrator, etc.; a storage apparatus 908 including, for example, a magnetic tape, a hard disk, etc.; and a communication apparatus 909. The communication apparatus 909 may allow the electronic device 900 to communicate in a wireless or wired manner with other apparatuses to exchange data. Although FIG. 14 illustrates an electronic device 900 having various apparatuses, it is to be understood that not all illustrated apparatuses are required to be implemented or provided. More or fewer apparatuses may alternatively be implemented or provided.

In particular, processes described above with reference to flow diagrams may be implemented as computer software programs in accordance with the embodiments of the present disclosure. For example, an embodiment of the present disclosure includes a computer program product including a computer program borne on a computer-readable medium, the computer program includes program codes for executing the method illustrated in the flow diagrams. In such embodiments, the computer program may be downloaded and installed from a network via the communication apparatus 909, or installed from the storage apparatus 908, or installed from the ROM 902. The computer program, when executed by the processing apparatus 901, executes the above functions defined in the method of the embodiments of the present disclosure.

It needs to be noted that the computer-readable medium described above in the present disclosure can be either a computer-readable signal medium or a computer-readable storage medium or any combination of the two. The computer-readable storage medium can be, for example, but not limited to, an electronic, magnetic, optical, electromagnetic, infrared, or semiconductor system, apparatus, or component, or a combination of any of the foregoing. More specific examples of the computer-readable storage medium may include, but are not limited to: an electrical connection having one or more leads, a portable computer diskette, a hard disk, a random access memory (RAM), a read only memory (ROM), an erasable programmable read only memory (EPROM or flash memory), an optical fiber, a portable compact disc read only memory (CD-ROM), an optical storage apparatus, a magnetic storage apparatus, or any suitable combination thereof. In the present disclosure, the computer-readable storage medium may be any tangible medium that can contain or store a program. The program can be used by or in connection with an instruction execution system, apparatus, or component. In the present disclosure, a computer-readable signal medium may include a data signal, in which a computer-readable program code is borne, propagated in the baseband or as part of a carrier. Such propagated data signals may take many forms, including but not limited to electromagnetic signals, optical signals, or any suitable combination of the preceding. The computer-readable signal medium can also be any computer-readable medium other than the computer-readable storage medium. The computer-readable signal medium may send, propagate, or transmit a program for use by or in combination with an instruction execution system, apparatus, or component. The program code contained in the computer-readable medium can be transmitted with any appropriate medium, including but not limited to: a wire, an optical cable, RF (radio frequency), etc., or any appropriate combination of the foregoing.

The computer-readable medium may be included in the electronic device, or it may also exist separately and not fitted into the electronic device.

The computer-readable medium bears one or more programs which, when executed by the electronic device, cause the electronic device to execute the method shown in the embodiments described above.

The computer program code for executing the operations of the present disclosure may be written in one or more programming languages or a combination thereof. The programming languages include object-oriented programming languages such as Java, Smalltalk, C++, and conventional procedural programming languages such as "C" language or similar programming languages. The program code can be executed completely on a user computer, partially on the user computer, as one independent software package, partially on the user computer and partially on a remote computer, or completely on the remote computer or server. In the case involving a remote computer, the remote computer may be connected to the user computer through any kind of network, including a local area network (LAN) or a wide area network (WAN), or may be connected to an external computer (e.g. through an Internet connection by using an Internet service provider).

The flowcharts and block diagrams in the drawings illustrate the architecture, functionality, and operation of possible implementations of a system, a method, and a computer program product according to various embodiments of the present disclosure. In this regard, each block in the flowchart or block diagram may represent one module, a program segment, or a portion of the code, which contains one or more executable instructions for implementing the specified logical function. It should also be noted that in some alternative implementations, the functions noted in the blocks may occur out of the order noted in the figures. For example, two successive blocks may in fact be executed substantially in parallel, or they may sometimes be executed in the reverse order, depending upon the functionality involved. It should also be noted that each block in the block diagram and/or flowchart, and the combination of the block(s) in the block diagram and/or flowchart, can be implemented by a dedicated hardware-based system that executes the specified function or operation, or can be realized by a combination of dedicated hardware and computer instructions.

The elements involved in the embodiments of the present disclosure can be realized by software or hardware. Where the name of the unit does not in some cases constitute a limitation on the unit itself, for example, the first acquisition unit may also be described as "a unit acquiring at least two Internet Protocol addresses".

The functions described herein above may be executed, at least in part, by one or more hardware logic parts. For example, without limitation, exemplary types of hardware logic parts that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the preceding. More specific examples of a machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the preceding.

In a first aspect, according to one or more embodiments of the present disclosure, there is provided a video content preview interactive method, including:
    displaying a video-playing interface, where a progress bar component is provided in the video-playing interface, and the progress bar component is used for displaying a playing progress of a target video played in the video-playing interface; and in response to a moving instruction for the progress bar component, displaying a target caption corresponding to a target timestamp of the target video, where the moving instruction indicates the target timestamp of the target video, and the target caption indicates a video content of the target video at the target timestamp.

According to one or more embodiments of the present disclosure, the progress bar component includes a first progress identification and a second progress identification, the first progress identification is used for controlling a preview position of the target video, and the second progress identification is used for controlling the playing progress of the target video; where in response to the moving instruction for the progress bar component, displaying the target caption corresponding to the target timestamp of the target video includes: in response to the moving instruction for the first progress identification, displaying target caption corresponding to the preview position in a video preview view of the video-playing interface.

According to one or more embodiments of the present disclosure, the target caption has a caption attribute characterizing a caption style and/or a caption effect corresponding to the target caption; the caption attribute of the target caption is determined by the first video position.

According to one or more embodiments of the present disclosure, the caption attribute includes at least one of: font type, font size, and font color.

According to one or more embodiments of the present disclosure, where displaying the target caption corresponding to the target timestamp of the target video includes: acquiring target caption data corresponding to the target video, wherein the target caption data comprises subtitle caption of the target video at at least two video positions, and the subtitle caption is generated by audio information of the target video at a corresponding video position; displaying subtitle caption corresponding to the first video position as the target caption.

According to one or more embodiments of the present disclosure, where acquiring the target caption data corresponding to the target video includes: acquiring a subtitle caption category corresponding to the target video, wherein the subtitle caption category characterizes a language used by the subtitle caption in the caption data; acquiring the target caption data corresponding to the target video based on the subtitle caption category corresponding to the target video.

According to one or more embodiments of the present disclosure, a first language component is provided in the video-playing interface, and the language component is used for presenting at least two subtitle caption categories; where acquiring the subtitle caption category corresponding to the target video includes: detecting the number of subtitle caption categories corresponding to the target video; if the number of subtitle caption categories is greater than one, setting the first language component to an available state; and determining a target subtitle caption category corresponding to the target video in response to a setting instruction for the first language component.

According to one or more embodiments of the present disclosure, where acquiring the target caption data corresponding to the target video includes: searching for alternative caption data corresponding to the target video; displaying data identifications corresponding to at least two pieces of alternative caption data; in response to a selecting instruction for a target data identification, downloading target caption data corresponding to the target data identification.

In a second aspect, according to one or more embodiments of the present disclosure, there is provided a video content preview interactive apparatus including:
 a displaying module, configured to display a video-playing interface, where a progress bar component is provided in the video-playing interface, and the progress bar component is used for displaying a playing progress of a target video played in the video-playing interface;
 a processing module, configured to, in response to a moving instruction for the progress bar component, display a target caption corresponding to a target timestamp of the target video, wherein the moving instruction indicates the target timestamp of the target video, and the target caption indicates a video content of the target video at the target timestamp.

According to one or more embodiments of the present disclosure, the progress bar component includes a first progress identification and a second progress identification, the first progress identification is used for controlling a preview position of the target video, and the second progress identification is used for controlling the playing progress of the target video; the processing module is specifically configured to: in response to the moving instruction for the first progress identification, display target caption corresponding to the preview position in a video preview view of the video-playing interface.

According to one or more embodiments of the present disclosure, the target caption has a caption attribute characterizing a caption style and/or a caption effect corresponding to the target caption; the caption attribute of the target caption is determined by the first video position.

According to one or more embodiments of the present disclosure, the caption attribute includes at least one of: font type, font size, and font color.

According to one or more embodiments of the present disclosure, when displaying the target caption corresponding to the target timestamp of the target video, the processing module is specifically configured to: acquire target caption data corresponding to the target video, where the target caption data includes subtitle caption of the target video at at least two video positions, and the subtitle caption is generated by audio information of the target video at a corresponding video position; and display subtitle caption corresponding to the first video position as the target caption.

According to one or more embodiments of the present disclosure, when acquiring the target caption data corresponding to the target video, the processing module is specifically configured to: acquire a subtitle caption category corresponding to the target video, where the subtitle caption category characterizes a language used by the subtitle caption in the caption data; and acquire the target caption data corresponding to the target video based on the subtitle caption category corresponding to the target video.

According to one or more embodiments of the present disclosure, a first language component is provided in the video-playing interface, and the language component is used for presenting at least two subtitle caption categories; when acquiring the subtitle caption category corresponding to the target video, the processing module is specifically configured to: detect the number of subtitle caption categories corresponding to the target video; if the number of subtitle caption categories is greater than one, set the first language component to an available state; determine a target subtitle caption category corresponding to the target video in response to a setting instruction for the first language component.

According to one or more embodiments of the present disclosure, when acquiring the target caption data corresponding to the target video, the processing module is specifically configured to: search for alternative caption data corresponding to the target video; display data identifications corresponding to at least two pieces of alternative caption data; in response to a selecting instruction for a target data identification, download target caption data corresponding to the target data identification.

In a third aspect, according to one or more embodiments of the present disclosure, there is provided an electronic device including: a processor and a memory communicatively connected to the processor;
 where the memory stores a computer executable instruction;
 the processor executes the computer executable instruction stored in the memory to implement the video content preview interactive method as described above in the first aspect and the various possible designs of the first aspect.

In a fourth aspect, according to one or more embodiments of the present disclosure, there is provided a computer-readable storage medium having stored therein a computer executable instruction, when the computer executable instruction is executed by a processor, the video content preview interactive method as described above in the first aspect and the various possible designs of the first aspect is implemented.

In a fifth aspect, an embodiment of the present disclosure provides a computer program product including a computer program, when the computer program is executed by a processor, the video content preview interactive method as described above in the first aspect and the various possible designs of the first aspect is implemented.

The above description is only a preferred embodiment of the present disclosure and an explanation of the applied technical principles. Those skilled in the art should understand that the disclosure scope involved in the present disclosure is not limited to the technical solutions formed by a specific combination of the above technical features, but should also cover other technical solutions formed by a random combination of the above technical features or equivalent features thereof without departing from the above-disclosed concept. For example, a technical solution formed by replacing the above-mentioned features and the technical features disclosed in (but not limited to) the present disclosure having similar functions with each other.

Further, while operations are depicted in a particular order, this should not be construed as requiring the operations to be executed in the particular order shown or in sequential order. Under certain circumstances, multitasking and parallel processing may be advantageous. Likewise, several specific implementation details have been included in the above discussion, but these should not be construed as limiting the scope of the present disclosure. Certain features that are described in the context of separate embodiments may also be implemented in combination in a single embodiment. Conversely, various features that are described in the context of a single embodiment can also be implemented in multiple embodiments separately or in any suitable sub-combination.

Although the subject matter has been described in language specific to structural features and/or method and logical acts, it should be understood that the subject matter defined in the appended claims is not necessarily limited to the specific features or acts described above. Rather, the specific features and acts described above are merely exemplary forms for implementing the claims.

What is claimed is:

1. A video content preview interactive method, comprising:
    displaying a video-playing interface, wherein a progress bar component is provided in the video-playing interface, and the progress bar component is used for displaying a playing progress of a target video played in the video-playing interface;
    in response to a moving instruction for the progress bar component, displaying a target caption corresponding to a target timestamp of the target video, wherein the moving instruction indicates the target timestamp of the target video, and the target caption indicates a video content of the target video at the target timestamp;
    wherein the progress bar component comprises a first progress identification and a second progress identification that are concurrently displayed, the first progress identification is used for controlling a preview position of the target video, and the second progress identification is used for controlling the playing progress of the target video;
    wherein in response to the moving instruction for the progress bar component, displaying the target caption corresponding to the target timestamp of the target video comprises:
    in response to the moving instruction for the first progress identification, displaying target caption corresponding to the preview position in a video preview view of the video-playing interface.

2. The method according to claim 1, wherein the target caption has a caption attribute characterizing at least one of a caption style and caption effect corresponding to the target caption;
    the caption attribute of the target caption is determined by the target timestamp of the target video.

3. The method according to claim 2, wherein the caption attribute comprises at least one of:
    font type, font size, and font color.

4. The method according to claim 1, wherein displaying the target caption corresponding to the target timestamp of the target video comprises:
    acquiring target caption data corresponding to the target video, wherein the target caption data comprises subtitle caption of the target video at, at least two video positions, and the subtitle caption is generated by audio information of the target video at a corresponding video position;
    displaying subtitle caption corresponding to the target timestamp of the target video as the target caption.

5. The method according to claim 4, wherein acquiring the target caption data corresponding to the target video comprises:
    acquiring a subtitle caption category corresponding to the target video, wherein the subtitle caption category characterizes a language used by the subtitle caption in the caption data;
    acquiring the target caption data corresponding to the target video based on the subtitle caption category corresponding to the target video.

6. The method according to claim 5, wherein a first language component is provided in the video-playing interface, and the language component is used for presenting at least two subtitle caption categories;
    wherein acquiring the subtitle caption category corresponding to the target video comprises:
    detecting a number of subtitle caption categories corresponding to the target video;
    if the number of subtitle caption categories is greater than one, setting the first language component to an available state;
    determining a target subtitle caption category corresponding to the target video in response to a setting instruction for the first language component.

7. The method according to claim 4, wherein acquiring the target caption data corresponding to the target video comprises:
    searching for alternative caption data corresponding to the target video;
    displaying data identifications corresponding to at least two pieces of alternative caption data;
    in response to a selecting instruction for a target data identification, downloading target caption data corresponding to the target data identification.

8. An electronic device, comprising: a processor and a memory communicatively connected to the processor;
    wherein the memory stores a computer executable instruction;
    the computer executable instruction stored in the memory is executed by the processor, the processor is caused to:
    display a video-playing interface, wherein a progress bar component is provided in the video-playing interface, and the progress bar component is used for displaying a playing progress of a target video played in the video-playing interface;
    in response to a moving instruction for the progress bar component, display a target caption corresponding to a target timestamp of the target video, wherein the moving instruction indicates the target timestamp of the target video, and the target caption indicates a video content of the target video at the target timestamp;
    wherein the progress bar component comprises a first progress identification and a second progress identification that are concurrently displayed, the first progress identification is used for controlling a preview position of the target video, and the second progress identification is used for controlling the playing progress of the target video;
    wherein the processor is caused to:
    in response to the moving instruction for the first progress identification, display target caption corresponding to the preview position in a video preview view of the video-playing interface.

9. The electronic device according to claim 8, wherein the target caption has a caption attribute characterizing at least one of a caption style and caption effect corresponding to the target caption;
    the caption attribute of the target caption is determined by the target timestamp of the target video.

10. The electronic device according to claim 9, wherein the caption attribute comprises at least one of:
    font type, font size, and font color.

11. The electronic device according to claim 8, wherein the processor is caused to:
acquire target caption data corresponding to the target video, wherein the target caption data comprises subtitle caption of the target video at at least two video positions, and the subtitle caption is generated by audio information of the target video at a corresponding video position;
display subtitle caption corresponding to the target timestamp of the target video as the target caption.

12. The electronic device according to claim 11, wherein the processor is caused to:
acquire a subtitle caption category corresponding to the target video, wherein the subtitle caption category characterizes a language used by the subtitle caption in the caption data;
acquire the target caption data corresponding to the target video based on the subtitle caption category corresponding to the target video.

13. The electronic device according to claim 12, wherein a first language component is provided in the video-playing interface, and the language component is used for presenting at least two subtitle caption categories;
wherein the processor is caused to:
detect a number of subtitle caption categories corresponding to the target video;
if the number of subtitle caption categories is greater than one, set the first language component to an available state;
determine a target subtitle caption category corresponding to the target video in response to a setting instruction for the first language component.

14. The electronic device according to claim 11, wherein the processor is caused to:
search for alternative caption data corresponding to the target video;
display data identifications corresponding to at least two pieces of alternative caption data;
in response to a selecting instruction for a target data identification, download target caption data corresponding to the target data identification.

15. A non-transitory computer-readable storage medium storing a computer executable instruction, wherein when a processor executes the computer executable instruction, the processor is caused to:
display a video-playing interface, wherein a progress bar component is provided in the video-playing interface, and the progress bar component is used for displaying a playing progress of a target video played in the video-playing interface;
in response to a moving instruction for the progress bar component, display a target caption corresponding to a target timestamp of the target video, wherein the moving instruction indicates the target timestamp of the target video, and the target caption indicates a video content of the target video at the target timestamp;
wherein the progress bar component comprises a first progress identification and a second progress identification that are concurrently displayed, the first progress identification is used for controlling a preview position of the target video, and the second progress identification is used for controlling the playing progress of the target video;
wherein the processor is caused to:
in response to the moving instruction for the first progress identification, display target caption corresponding to the preview position in a video preview view of the video-playing interface.

16. The non-transitory computer-readable storage medium according to claim 15, wherein the target caption has a caption attribute characterizing at least one of a caption style and caption effect corresponding to the target caption;
the caption attribute of the target caption is determined by the target timestamp of the target video.

17. The non-transitory computer-readable storage medium according to claim 15, wherein the processor is caused to:
acquire target caption data corresponding to the target video, wherein the target caption data comprises subtitle caption of the target video at at least two video positions, and the subtitle caption is generated by audio information of the target video at a corresponding video position;
display subtitle caption corresponding to the target timestamp of the target video as the target caption.

* * * * *